US011903486B2

(12) United States Patent
Dokhanian

(10) Patent No.: US 11,903,486 B2
(45) Date of Patent: Feb. 20, 2024

(54) STEP STOOL

(71) Applicant: Bijan Dokhanian, Los Angeles, CA (US)

(72) Inventor: Bijan Dokhanian, Los Angeles, CA (US)

( * ) Notice: Subject to any disclaimer, the term of this patent is extended or adjusted under 35 U.S.C. 154(b) by 496 days.

(21) Appl. No.: 16/306,452

(22) PCT Filed: Jul. 31, 2018

(86) PCT No.: PCT/US2018/044721
§ 371 (c)(1),
(2) Date: Nov. 30, 2018

(65) Prior Publication Data

US 2021/0085086 A1 Mar. 25, 2021

Related U.S. Application Data

(60) Provisional application No. 62/605,023, filed on Jul. 31, 2017.

(51) Int. Cl.
*A47C 12/00* (2006.01)
*E06C 1/00* (2006.01)

(52) U.S. Cl.
CPC .............. *A47C 12/00* (2013.01); *E06C 1/005* (2013.01)

(58) Field of Classification Search
CPC ........... A47C 12/00; A47C 12/02; E06C 1/02; E06C 1/005; E06C 1/383; E06C 1/26
USPC ...... 297/183.2, 183.1, 183.5, 423.39, 423.41
See application file for complete search history.

(56) References Cited

U.S. PATENT DOCUMENTS 1,133,109 A * 3/1915 Derbyshire .......... A47B 3/0912 108/132
1,786,458 A * 12/1930 Shipman .................. A47C 9/02 174/138 R
2,227,330 A * 12/1940 Turner ............... B65D 71/0014 206/168
2,689,061 A * 9/1954 Gray .................. B65D 71/0037 229/120.14
3,080,965 A * 3/1963 Kuchenbecker ....... B65D 71/02 294/87.2

(Continued)

*Primary Examiner* — Daniel P Cahn
*Assistant Examiner* — Shiref M Mekhaeil
(74) *Attorney, Agent, or Firm* — Procopio, Cory, Hargreaves & Savitch LLP; Pattric J. Rawlins

(57) ABSTRACT

A step stool is provided in various embodiments. A step stool in an embodiment includes a first top panel rotatably connected to a second top panel. It includes a front panel rotatably connected to the first top panel and a rear panel rotatably connected to the second top panel. It further includes a first side panel rotatably connected to the front panel and a second side panel rotatably connected to the first side panel and rotatably connected to the rear panel. It also includes a third side panel rotatably connected to the front panel and a fourth side panel rotatably connected to the third side panel and rotatably connected to the rear panel. It further includes a center support member having a first center panel rotatably connected to an underside of the first top panel, a second center panel rotatably connected to an underside of the second top panel and rotatably connected to the first center panel. It may also include a formation in which the first top panel includes a handle and the second top panel includes a recess in which the handle of the first top panel fits.

11 Claims, 8 Drawing Sheets

(56) References Cited

U.S. PATENT DOCUMENTS

| | | | | | |
|---|---|---|---|---|---|
| 3,307,549 | A * | 3/1967 | Zackheim | A61M 3/0208 | 383/44 |
| 3,528,600 | A * | 9/1970 | White | B65D 33/065 | 383/100 |
| 3,558,038 | A * | 1/1971 | Gelles | B42F 15/0029 | D9/434 |
| 3,805,711 | A * | 4/1974 | Lakso | A47B 23/001 | 108/133 |
| 4,121,744 | A * | 10/1978 | Minear | G06F 15/0216 | 294/149 |
| 4,406,365 | A * | 9/1983 | Kulig | B65D 71/0022 | 206/175 |
| 4,542,585 | A * | 9/1985 | Ito | B26B 19/28 | 30/298 |
| 4,630,861 | A * | 12/1986 | Henschel | A47C 4/08 | 297/44 |
| 4,753,320 | A * | 6/1988 | Walter | A47C 12/02 | 182/91 |
| 4,763,756 | A * | 8/1988 | Horan | A47C 12/02 | 182/20 |
| 4,958,853 | A * | 9/1990 | Doty | G09F 7/00 | 297/472 |
| 5,538,131 | A * | 7/1996 | Harrelson | B65D 71/0022 | D9/753 |
| 5,547,412 | A * | 8/1996 | Wilcox | A63H 33/00 | 108/50.02 |
| 5,609,175 | A * | 3/1997 | Gerry | A45B 9/02 | 135/25.4 |
| 5,782,562 | A * | 7/1998 | Anspacher | B65D 33/2508 | 383/17 |
| 5,797,649 | A * | 8/1998 | Snell, Jr. | B60N 2/38 | 297/14 |
| D407,310 | S * | 3/1999 | DuCorday | D9/434 | |
| D409,913 | S * | 5/1999 | Le Roux | D9/434 | |
| 5,992,803 | A * | 11/1999 | LeRoux | A45F 5/1026 | D9/434 |
| D460,566 | S * | 7/2002 | Henschel | D25/65 | |
| 6,427,804 | B1 * | 8/2002 | Lazarus | E06C 1/39 | 182/153 |
| 6,443,329 | B1 * | 9/2002 | Rochefort | B65D 5/061 | 222/105 |
| 6,568,506 | B1 * | 5/2003 | Donnalley | A47C 12/02 | 182/33 |
| 6,854,797 | B1 * | 2/2005 | Thomas | A47C 11/00 | 297/16.2 |
| 6,913,159 | B1 * | 7/2005 | Goldberg | B65D 23/106 | 215/396 |
| D579,680 | S * | 11/2008 | Emert | D6/353 | |
| 7,497,514 | B2 * | 3/2009 | Ramsey | A47C 7/66 | 297/42 |
| D608,637 | S * | 1/2010 | Getsy | D9/434 | |
| D615,667 | S * | 5/2010 | Dunn | D25/65 | |
| D643,991 | S * | 8/2011 | Miller | D34/28 | |
| 8,496,289 | B2 * | 7/2013 | Chen | A47B 3/083 | 108/130 |
| D707,975 | S * | 7/2014 | Habraken | D6/353 | |
| 8,869,979 | B2 * | 10/2014 | Smalley | B65D 71/0055 | 206/427 |
| D751,309 | S * | 3/2016 | Habraken | D25/65 | |
| 9,648,958 | B2 * | 5/2017 | Pectol | A47C 9/10 | |
| 10,271,655 | B1 * | 4/2019 | Gwen | A47C 4/10 | |
| D859,017 | S * | 9/2019 | Baker | D6/353 | |
| 2003/0159950 | A1 * | 8/2003 | Jones | B65D 71/0055 | 206/163 |
| 2003/0217889 | A1 * | 11/2003 | Sapatova | A47C 12/02 | 182/33 |
| 2004/0231918 | A1 * | 11/2004 | Meeker | A47C 12/02 | 182/33 |
| 2006/0076806 | A1 * | 4/2006 | Entz | A61G 5/08 | 297/42 |
| 2007/0007416 | A1 * | 1/2007 | Vogel | A47F 5/112 | 248/311.2 |
| 2007/0181366 | A1 * | 8/2007 | Astor | E06C 7/14 | 182/129 |
| 2008/0093167 | A1 * | 4/2008 | Saunders | A47C 12/00 | 182/222 |
| 2009/0261643 | A1 * | 10/2009 | Kay | A47C 9/10 | 297/335 |
| 2010/0006458 | A1 * | 1/2010 | Wilkins | B65D 71/0022 | 229/125.33 |
| 2010/0187041 | A1 * | 7/2010 | Crouch | A47D 15/003 | 182/223 |
| 2011/0000970 | A1 * | 1/2011 | Abraham | G06K 19/07749 | 235/492 |
| 2011/0056975 | A1 * | 3/2011 | McGillion | B65D 5/0227 | 220/810 |
| 2011/0114419 | A1 * | 5/2011 | Merey | E06C 1/383 | 182/152 |
| 2011/0315586 | A1 * | 12/2011 | Horton | B65D 21/022 | 206/459.5 |
| 2012/0040197 | A1 * | 2/2012 | Suzuki | B29C 51/16 | 428/516 |
| 2013/0048428 | A1 * | 2/2013 | Chancler | A47C 4/10 | 182/155 |
| 2014/0131138 | A1 * | 5/2014 | Simpson | A47C 12/00 | 182/223 |
| 2014/0326628 | A1 * | 11/2014 | Fox | B65D 51/32 | 206/459.5 |
| 2015/0083522 | A1 * | 3/2015 | Chancler | A47C 12/00 | 182/152 |
| 2015/0145158 | A1 * | 5/2015 | Levine | B29C 64/112 | 264/308 |
| 2015/0322717 | A1 * | 11/2015 | Gibson | A47C 12/00 | 182/210 |
| 2016/0309903 | A1 * | 10/2016 | Huang | A47C 4/04 | |
| 2017/0215594 | A1 * | 8/2017 | Baker | A47C 12/00 | |
| 2018/0255935 | A1 * | 9/2018 | Goldberg | A47C 31/007 | |
| 2018/0339433 | A1 * | 11/2018 | Lin | B29C 45/263 | |
| 2019/0266465 | A1 * | 8/2019 | Uijlenbroek | G06K 19/025 | |
| 2020/0386050 | A1 * | 12/2020 | Mittanck | E06C 1/393 | |
| 2021/0053306 | A1 * | 2/2021 | Cassidy | B60C 99/00 | |

* cited by examiner

STEP STOOL

BACKGROUND

In general, step stools provide a simple, utilitarian function that one often forgets about. However, when a step stool is not handy, that can prove inconvenient. Thus, it can be useful to have a lightweight object that serves as a step stool.

Additionally, when a step stool breaks, that can be calamitous. For example, one may fall and injure may occur. Additionally, property may be damaged due to a falling person or object the person sought to reach or place at a height. Moreover, the step stool itself is broken at that time, necessitating replacement or some other solution. Thus, providing a sturdy step stool may be useful.

Step stools may also be used by children or others who are developing confidence. A child may use a step stool as a part of the process of learning to do new activities or reach things that are coming into reach in the growing process. Others may use a step stool to reach things that are a part of their lives or jobs, for example. Users of a step stool may thus benefit from messages of encouragement or support, for example, which may be useful when provided as part of a step stool.

BRIEF DESCRIPTION OF THE DRAWINGS

The present invention is illustrated by way of example in the accompanying drawings. The drawings should be understood as illustrative rather than limiting.

DETAILED DESCRIPTION

A step stool is provided in various embodiments. The specific embodiments described in this document represent exemplary instances of the present invention, and are illustrative in nature rather than restrictive.

In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments.

Figure 1A:
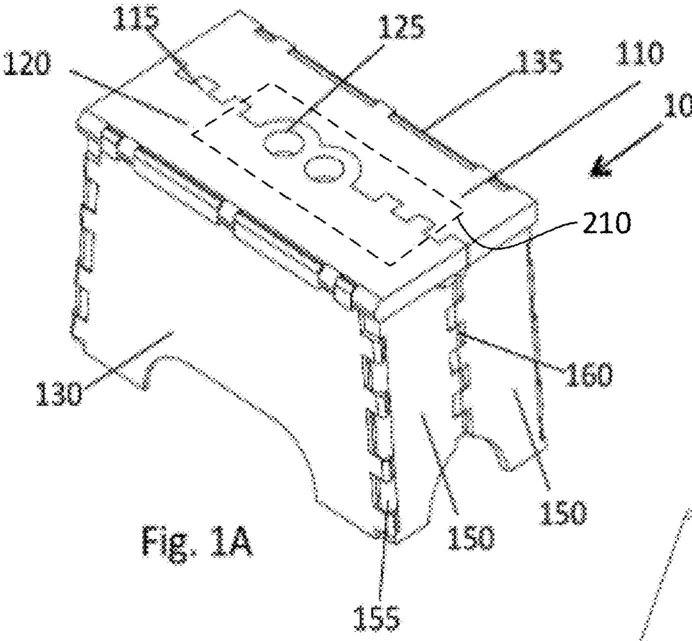
FIG. 1A illustrates a perspective view of an embodiment of a step stool.

FIG. 1A illustrates a perspective view of an embodiment of a step stool. Step stool 100 provides for a place where a person can step on the stool in the form of panels 110 and 120, which mate to form a top surface in the unfolded illustration of FIG. 1A. Panels 110 and 120 mate at coupling 115, which is a rotatable or hingedly fastened joint. When unfolded, panels 110 and 120 provide a plane or a planar surface on which something can be supported. Panels 110 and 120 also mate with front panels 130 through similar rotatable or hingedly fastened joints 135. In the embodiment shown, front panel 130 (and an obscured rear panel 130) each mate with side panels 150 at a similar rotatable or hingedly fastened joint 155. Panels 150 each mate with a paired panel 150 at another rotatable or hingedly fastened joint 160.

Figure 1B:
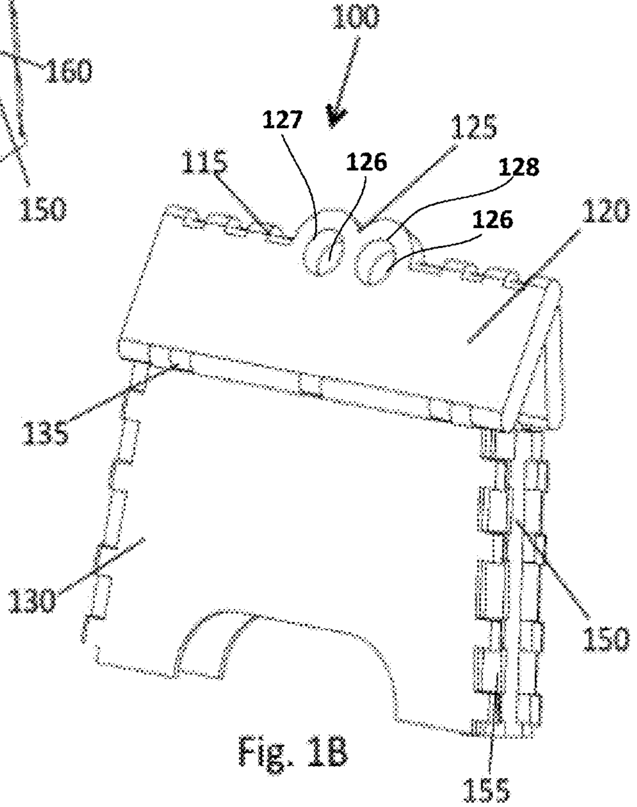
FIG. 1B illustrates a perspective view of an embodiment of the step stool of FIG. 1A, partially folded up.

FIG. 1B illustrates a perspective view of an embodiment of the step stool of FIG. 1A, partially folded up. As can be seen, the step stool 100 can be partially or completely collapsed or folded together, with the side panels 150 folding into face each other (outer surfaces facing), the top panels 110 and 120 folding up to face each other (inner surfaces facing) and the front and back panels 130 brought toward each other by this action. Moreover, the handle 125 of panel 120 comes into clearer view, with two through-holes 126 provided for ease of grip by an individual or for hanging the step stool 100, where each through-hole 126 has a contiguous through-hole perimeter (127, 128) defined by the respective through-hole 126 extending from the top surface of the panel 120 to the inner surface of the panel 120.

Figure 1C:
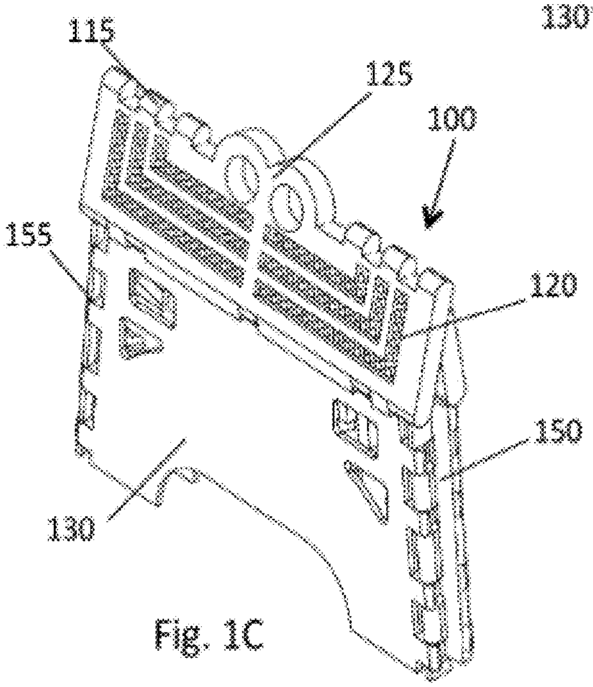
FIG. 1C illustrates a perspective view of another embodiment of the step stool of FIG. 1A, folded up.

FIG. 1C illustrates a perspective view of another embodiment of the step stool of FIG. 1A, folded up. When completely folded, the step stool 100 is more compact, with the front and back panels 130 nearly contacting each other.

Additionally, details are illustrated herein such as texturing provided on the top surface of panel 120 (this may be provided on panel 110 as well), and additional cutouts or through-holes in panel 130. Such details may be added to allow for better grip or friction, for example, for manufacturability (providing voids for a mold, for example), or for other purposes. Not shown are additional structural elements which may be provided, such as an internal latticework in one or more panels to provide for a hollow panel with less weight but still providing sufficient structural strength, for example. Additionally, other through-holes may be provided for specific applications, for embellishment, or for other purposes, for example.

Figure 2A:
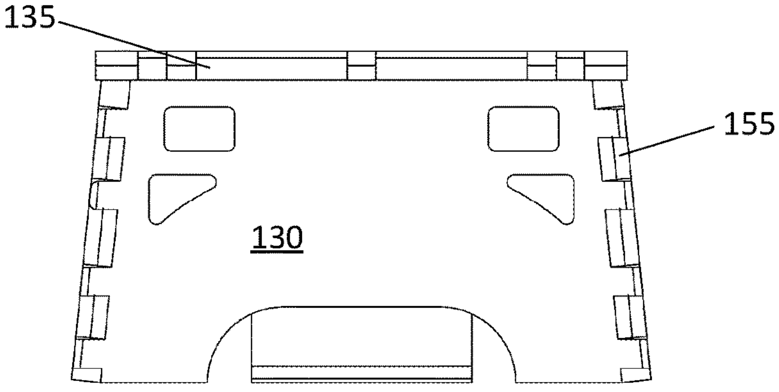
FIG. 2A illustrates a front view of an embodiment of the step stool of FIG. 1A, unfolded.
Figure 2B:
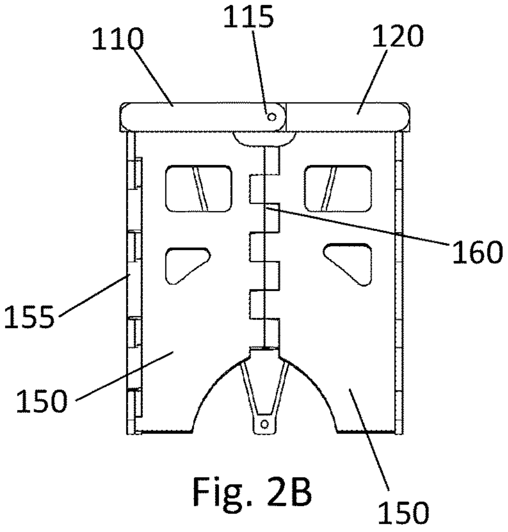
FIG. 2B illustrates a side view of an embodiment of the step stool of FIG. 1A, unfolded.
Figure 2C:
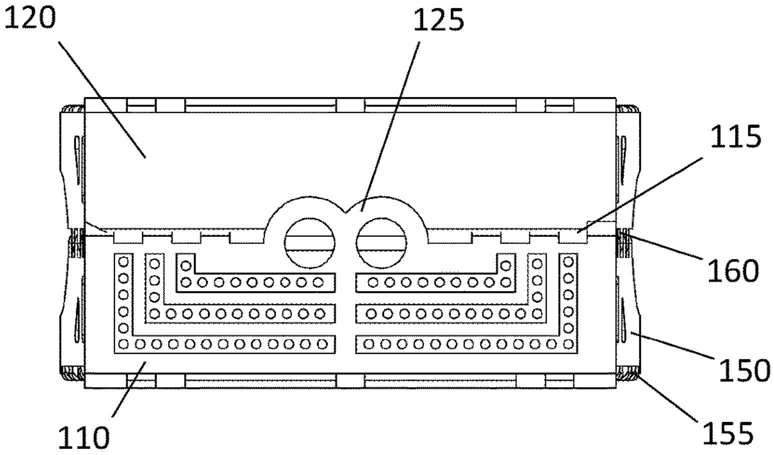
FIG. 2C illustrates a top view of an embodiment of the step stool of FIG. 1A, unfolded.

FIG. 2A illustrates a front view of an embodiment of the step stool of FIG. 1A, unfolded. FIG. 2B illustrates a side view of an embodiment of the step stool of FIG. 1A, unfolded. FIG. 2C illustrates a top view of an embodiment of the step stool of FIG. 1A, unfolded. Unfolded, the step stool 100 provides a surface upon which someone may step or objects may be placed.

Figure 3A:
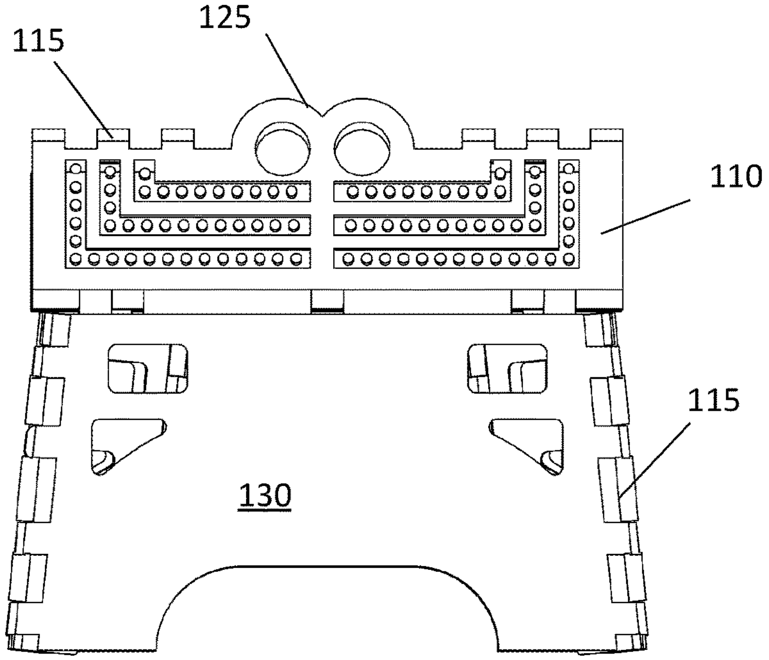
FIG. 3A illustrates a front view of an embodiment of the step stool of FIG. 1A, folded.
Figure 3B:
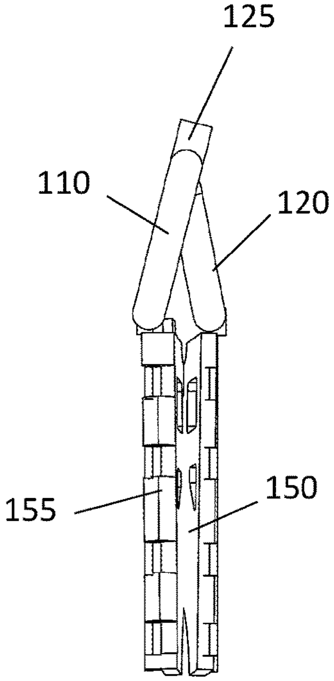
FIG. 3B illustrates a side view of an embodiment of the step stool of FIG. 1A, folded.
Figure 3C:
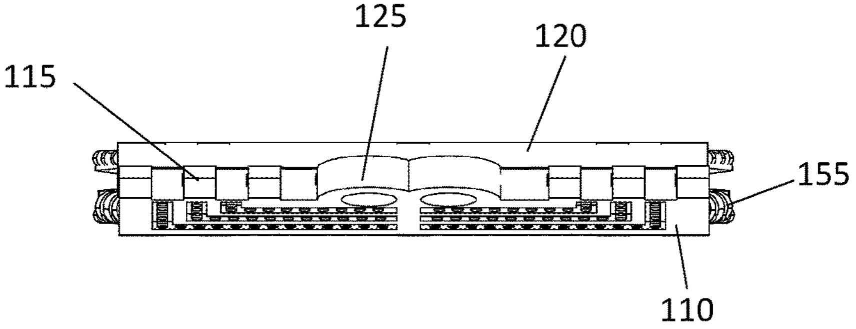
FIG. 3C illustrates a top view of an embodiment of the step stool of FIG. 1A, folded.

FIG. 3A illustrates a front view of an embodiment of the step stool of FIG. 1A, folded. FIG. 3B illustrates a side view of an embodiment of the step stool of FIG. 1A, folded. FIG. 3C illustrates a top view of an embodiment of the step stool of FIG. 1A, folded. Folded up, step stool 100 provides an easily transportable and lightweight object which one may carry or which one may store compactly or hang for ease of reach.

Figure 4:
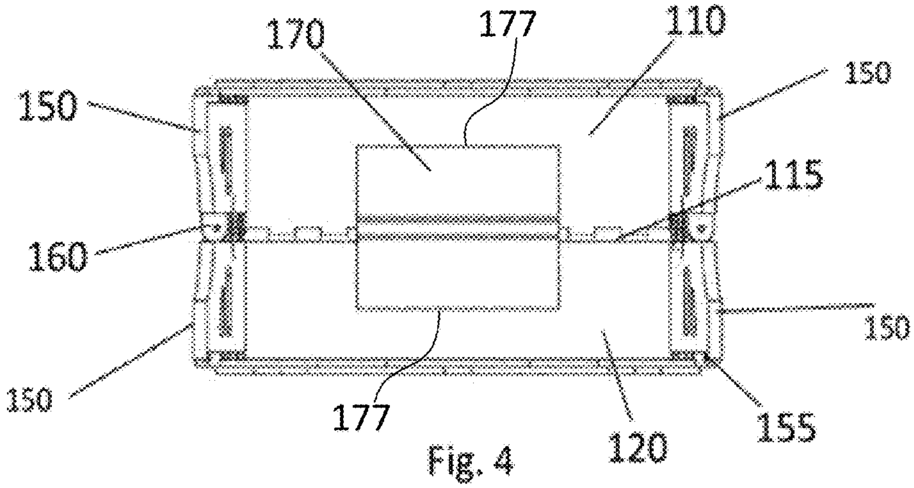
FIG. 4 illustrates a bottom view of another embodiment of the step stool of FIG. 1A, unfolded.
Figure 5A:
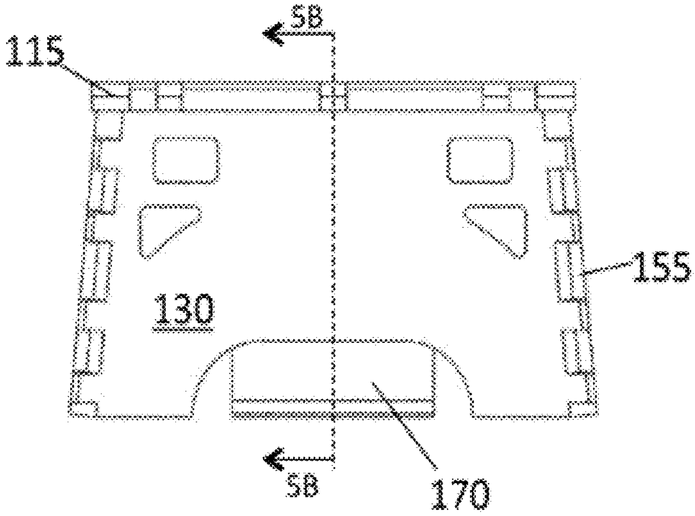
FIG. 5A illustrates a front view of an embodiment of the step stool of FIG. 4, unfolded, showing a cut line for FIG. 5B.
Figure 5B:
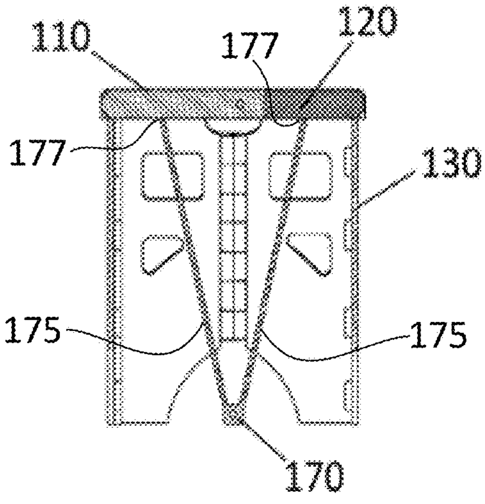
FIG. 5B illustrates a cutaway view of an embodiment of the step stool of FIG. 4, unfolded.

FIG. 4 illustrates a bottom view of another embodiment of the step stool of FIG. 1A, unfolded. Further illustrated in FIG. 4 is center support 170, which is attached to the bottom surface of panel 110 and panel 120. FIG. 5A illustrates a front view of an embodiment of the step stool of FIG. 4, unfolded, showing a cut line for FIG. 5B. FIG. 5B illustrates a cutaway view of an embodiment of the step stool of FIG. 4, unfolded. Center support 170 has two support panels 175, one attached to panel 110 and one attached to panel 120 in a flexible or hinged manner. The two support panels 175 of support 170 are rotatably or hingedly attached to form support 170, and the two support panels 175 of support 170 are formed to reach from hinged attachment points 177 of panels 110 and 120 to the same depth as the front and back panels 130 and the side panels 150, providing for a fifth support member in the middle of some embodiments of step stool 100.

The fifth central support member, embodied as member 170 in some embodiments, provides substantially greater support for more mass on step stool 100 in such embodiments. This central support member may allow for greater safety than embodiments lacking such a member and may provide for a more stable form of support for mass which concentrates in the center of the top of step stool 100, for example. Additionally, the hinged attachment points 177 of the two support panels 175 enable the support 170 to fold into the body of step stool 100 when it is folded up, as illustrated in FIGS. 2A (unfolded and visible) and 1C (folded and obscured by front panel 130). Thus, support member does not further encumber the visual features of step stool 100 or create an additional external feature of a folded step stool.

Figure 6A:
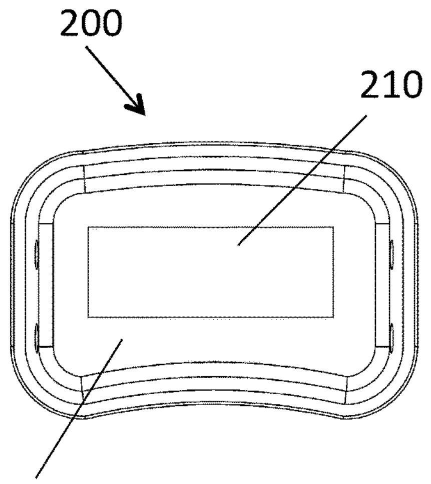
FIG. 6A illustrates a top view of another embodiment of a step stool.

While larger and stronger step stools are important in some contexts, smaller or simpler step stools can also be useful. FIG. 6A illustrates a top view of another embodiment of a step stool. Step stool 200 has a top surface 220 and a label 210 in an embodiment. Label 210 may be applied in a variety of ways. For example, it may be integrally formed with surface 220; it may be applied as a standalone panel or adhesive backed label; or it may be attached fixedly in some other way.

Figure 6B:
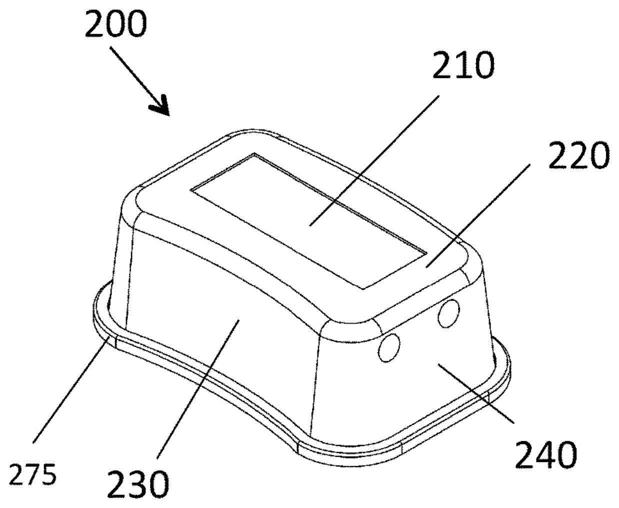
FIG. 6B illustrates a perspective view of the step stool of FIG. 6A.
Figure 6C:
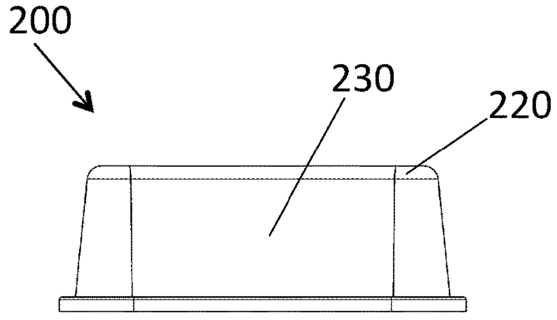
FIG. 6C illustrates a front view of the step stool of FIG. 6A.
Figure 6D:
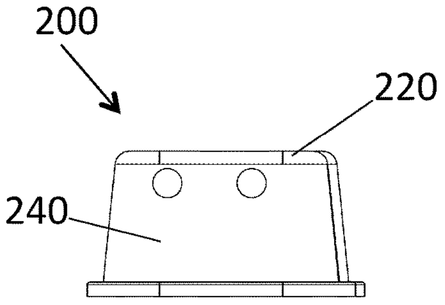
FIG. 6D illustrates a side view of the step stool of FIG. 6A.

FIG. 6B illustrates a perspective view of the step stool of FIG. 6A. Front and rear panels 230 may be straight or curved in various embodiments, for example, and side panels 240 may provide straight or curved design elements as well. FIG. 6C illustrates a front view of the step stool of FIG. 6A. FIG. 6D illustrates a side view of the step stool of FIG. 6A.

As shown, the step stool 200 has slightly curved or rounded edges and a lower lip 275, which may be covered in a non-skid material such as rubber, for example. Straight sides may also be used, and the non-skid lip may be omitted as well. Also, the label 210 is shown in a rectangular format, but it may be provided in other shapes and it may be expanded to fill or nearly fill panel 220, or sized in a smaller portion of panel 220, for example. Label 210 may provide an encouraging message such as "You can do it!" or "Good Job" for example.

Figure 7A:
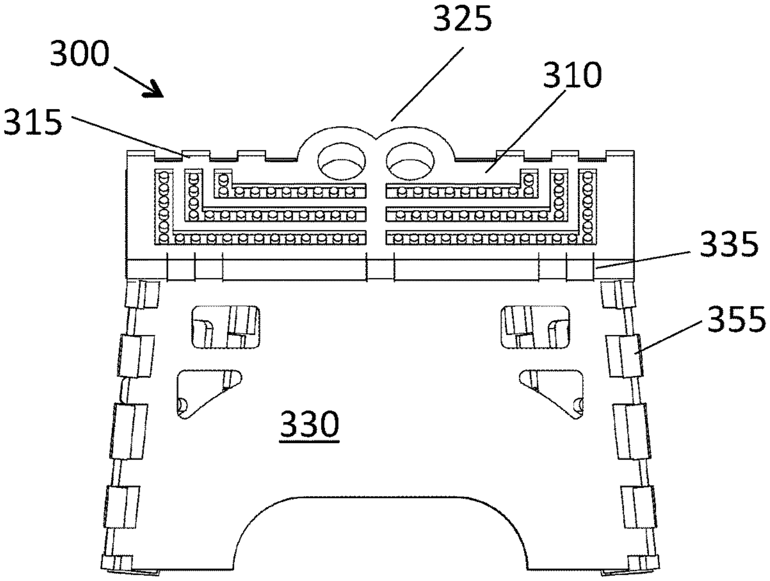
FIG. 7A illustrates a front view of yet another embodiment of a step stool, partially folded.

While the folding step stool of FIG. 1A provides additional strength, other step stools may be provided which are less strong but still functional. FIG. 7A illustrates a front view of yet another embodiment of a step stool, partially folded. Step stool 300 includes front panel 330 rotatably or hingedly attached to top panel 310 at joint 335 and rotatably or hingedly attached to side panels 350 at joints 355. Top panel 310 is hingedly or rotatably attached to a top panel 320 at joint 315.

Figure 7B:
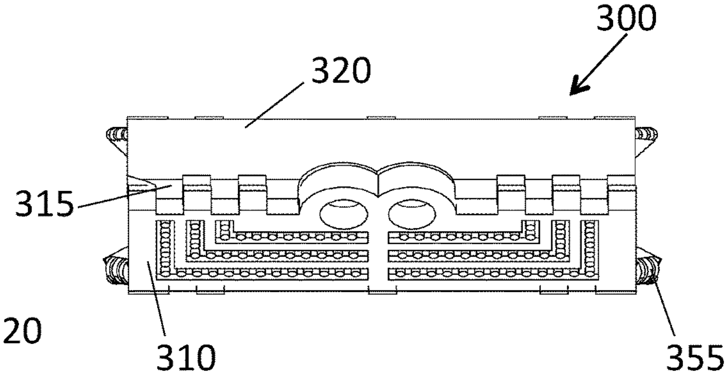
FIG. 7B illustrates a top view of the step stool of FIG. 7A.
Figure 7C:
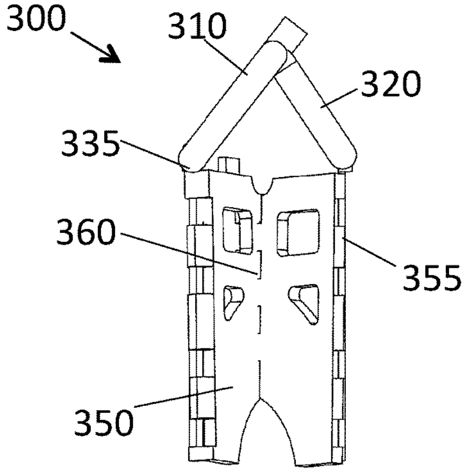
FIG. 7C illustrates a side view of the step stool of FIG. 7A.

FIG. 7B illustrates a top view of the step stool of FIG. 7A. FIG. 7C illustrates a side view of the step stool of FIG. 7A. Side panels 350 join at joint 360 in a hinged or rotatable fashion. A back panel 330 is also provided, attached in a hinged or rotatable fashion at joints 355 to side panels 350 and to top panel 320 in a similar hinged or rotatable fashion at a joint 335 as well.

Figure 8A:
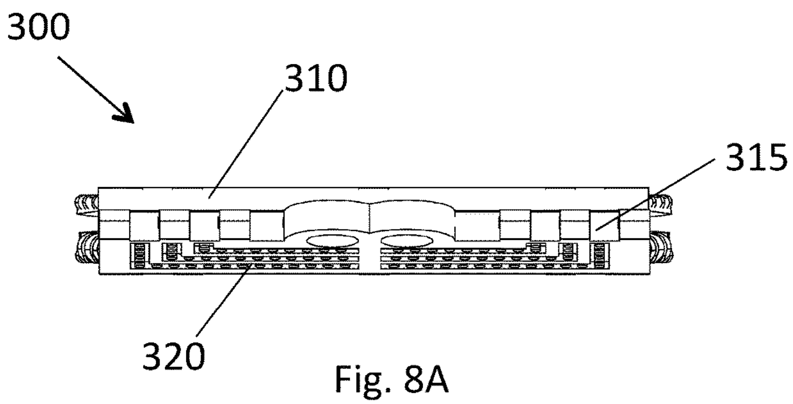
FIG. 8A illustrates a top view of an embodiment of the step stool of FIG. 7A, folded.
Figure 8B:
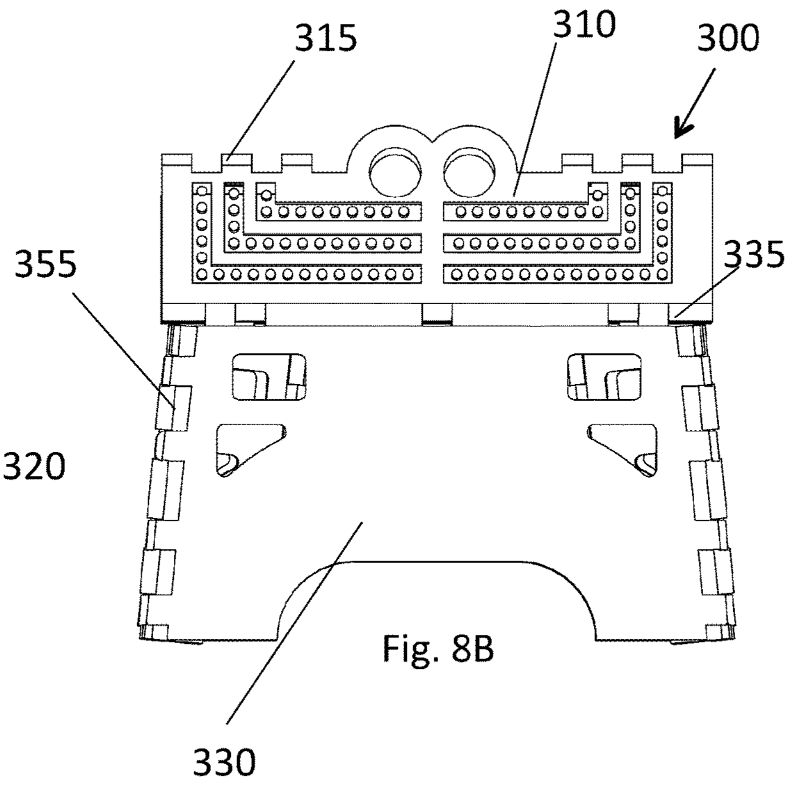
FIG. 8B illustrates a front view of an embodiment of the step stool of FIG. 7A, folded.
Figure 8C:
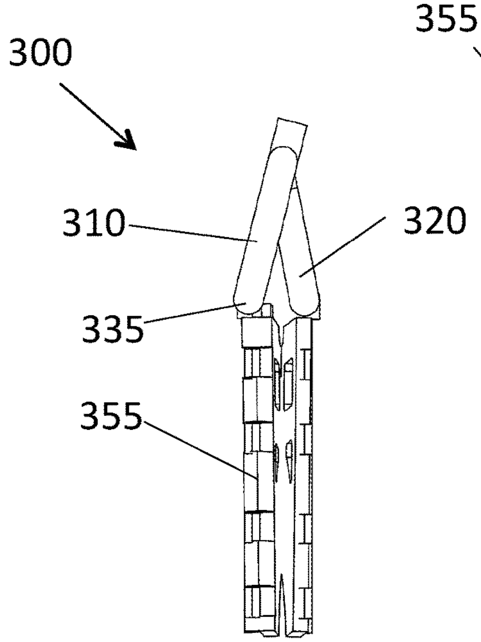
FIG. 8C illustrates a side view of an embodiment of the step stool of FIG. 7A, folded.

FIG. 8A illustrates a top view of an embodiment of the step stool of FIG. 7A, folded. FIG. 8B illustrates a front view of an embodiment of the step stool of FIG. 7A, folded. FIG. 8C illustrates a side view of an embodiment of the step stool of FIG. 7A, folded. As can be seen, step stool 300 is similar to step stool 100, without the center support. Notably, step stool 300 includes a handle 325, similar to handle 125, with through-holes provided for hanging or gripping. Additionally, texture, through-holes or cutouts and internal structure may be varied as with step stool 100.

Figure 9A:
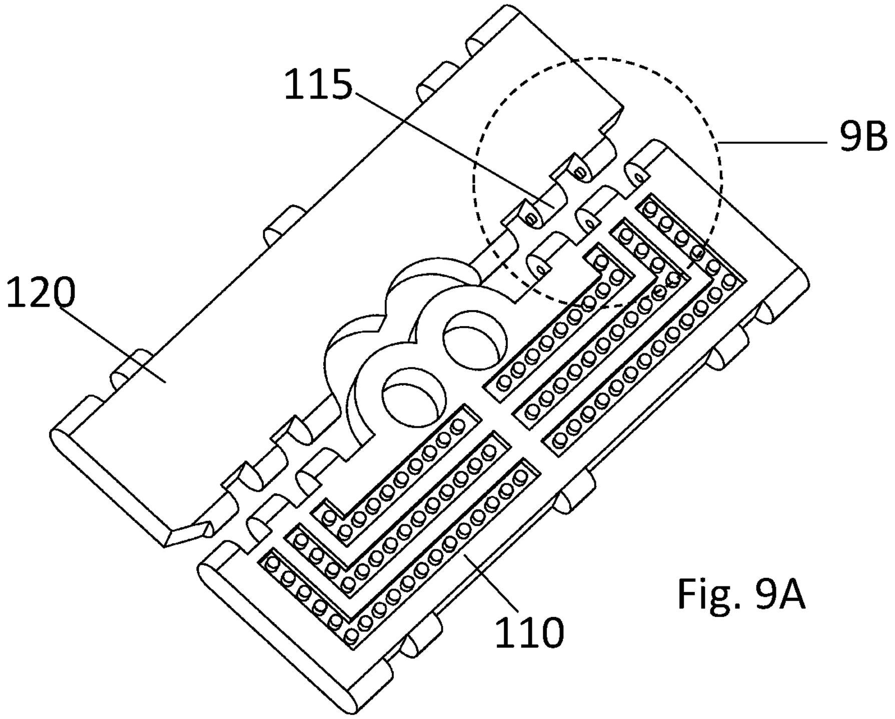
FIG. 9A illustrates an exploded view of portions of the step stool of FIG. 1A.
Figure 9B:
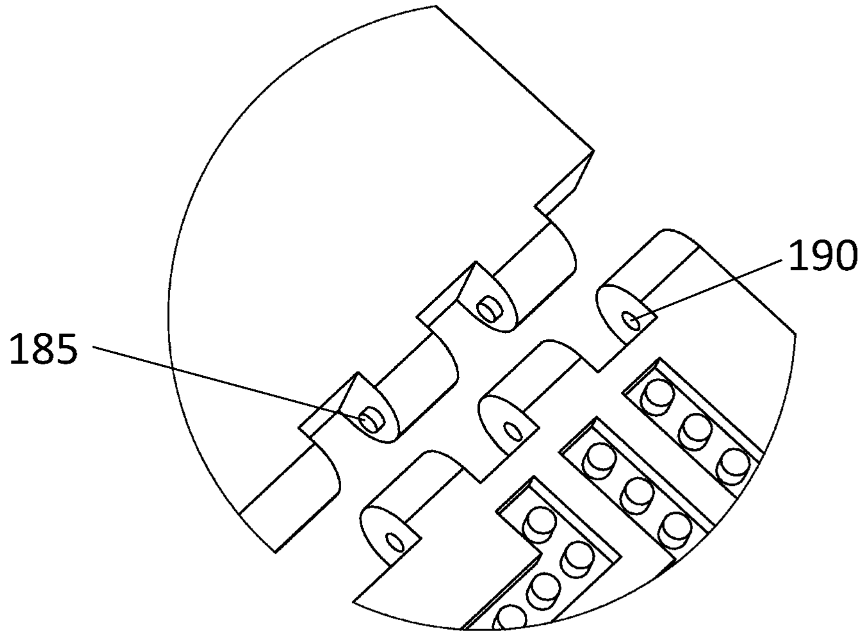
FIG. 9B illustrates a closeup view of a portion of FIG. 9A.

Connections in the folding embodiments can be provided in a variety of ways. For example, a traditional hinge attachment with a center pin can be used. FIG. 9A illustrates an exploded view of portions of the step stool of FIG. 1A. FIG. 9B illustrates a closeup view of a portion of FIG. 9A. As shown, the rotatably attached or hingedly attached joints use a pin 185 extending laterally from part of one panel to mate with a receptacle 190 in another panel. One may expect that such a joint would have pins and receptacles in each panel, for example. Alternatively, in some embodiments, pins may be provided in some panels and receptacles in mating panels.

Step stool 100 is shown in an essentially unadorned manner, whereas step stool 200 is shown with a label provided. An integral label such as label 210 may be provided for step stool 100 on one or both of panels 110 and 120 for a top-facing label, as shown in FIG. 1A. Such a label may be formed in the making of the panels or applied after formation. Similarly, a label may be provided for side panels 150 and/or front and rear panels 130, for example. Likewise, such a label may be provided for top panels 310 and 320 of step stool 300 as well. Similarly, labels may be provided for side panels 350 and for front or rear panels 330, for example. Thus, one may provide decorative or informative information in the various embodiments as an integrally formed label (such as in a mold or applied process), or as an externally applied label which achieves this result. Application of the label may involve screen printing, three-dimensional printing (e.g. thick film, for example), or some other application process, for example. Moreover, a small stool such as stool 200 may be formed in a foldable manner such as stool 300 or 100 as well. Likewise, stool 100 may be formed as an integral and non-foldable (e.g. rigid) stool similar to stool 200.

In each embodiment, hinged joints may be substituted for folding joints to form alternate embodiments. Thus, the center support may be attached to the top panels with folding joints, or the two parts of the center support may be attached to each other with a folding joint, for example. This may allow for easier manufacture but may also wear out faster in some embodiments, for example. The folding joints would still be rotatable, or rotatably connected, as would hinge joints or joints forming a hinge with pins and receptacles.

In each embodiment, when the step stool is unfolded, the side panels and front and rear panels will generally support the top panels in a plane essentially perpendicular to a surface of each of the side and front and rear panels. The center support provides further support in embodiments where it is present. For a rigid step stool such as step stool 200 or similar embodiments, the supporting panels may not be exactly perpendicular to the top panel, but will still generally provide support in such a manner and such a direction.

One skilled in the art will appreciate that although specific examples and embodiments of the system and methods have been described for purposes of illustration, various modifications can be made without deviating from present invention. For example, embodiments of the present invention may be applied to many different types of databases, systems and application programs. Moreover, features of one embodiment may be incorporated into other embodiments, even where those features are not described together in a single embodiment within the present document.

The invention claimed is:

1. A step stool, comprising:

a first top panel rotatably connected to a second top panel, the first top panel and second top panel defining a planar surface in an unfolded configuration, the first top panel comprising a handle that defines a first through-hole and a second through-hole, wherein the first through-hole and second through hole are separated by at least a portion of the handle; a front panel rotatably connected to the first top panel; a rear panel rotatably connected to the second top panel; a first side panel rotatably connected to the front panel; a second side panel rotatably connected to the first side panel and rotatably connected to the rear panel; a third side panel rotatably connected to the front panel; a fourth side panel rotatably connected to the third side panel and rotatably connected to the rear panel; a center support member having a first support panel rotatably connected to an underside of the first top panel at a first hinged joint, a second support panel rotatably connected to an underside of the second top panel at a second hinged joint and rotatably connected to the first support panel; a first foot defined by a portion of the front panel and a portion of the first side panel; a second foot defined by a second portion of the front panel and a portion of the third side panel, a third foot defined by a portion of the rear panel and a portion of the second side panel; a fourth foot defined by a second portion of the rear panel and a portion of the fourth side panel; and a fifth foot defined by a portion of the first support panel and a portion of the second-support panel; wherein the first foot, the second foot, the third foot and the fourth foot have equal depth measured from the planar surface and wherein, the first and second support panels are rotatably connected at a depth from the first and second hinged joints respectively, equal to the depth of the first foot, the second foot, the third foot and the fourth foot.

2. The step stool of claim 1, wherein:

the first support panel is connected to the first top panel in a first folding joint; and the second support panel is connected to the second top panel in a second folding joint.

3. The step stool of claim 1, wherein: each rotatable connection comprises a hinged joint.

4. The step stool of claim 3, wherein: each hinged joint comprises pins and receptacles.

5. The step stool of claim 1, wherein: the second top panel includes a recess in which the handle of the first top panel fits.

6. The step stool of claim 5, wherein: the first through-hole extends from a top surface of the first top panel to an inner surface of the first top panel to define a contiguous first through-hole perimeter and the second through-hole extends from the top surface of the first top panel to the inner surface of the first top panel to define a contiguous second through-hole perimeter.

7. The step stool of claim 6, wherein: the first top panel and the second top panel include frictional surfaces as a top surface of each top panel, wherein at least one frictional surface comprises rubber.

8. The step stool of claim 6, wherein: the first top panel and the second top panel include a label.

9. The step stool of claim 8, wherein: the label is integrally formed as part of the first top panel and the second top panel.

10. The step stool of claim 1, wherein the first support panel and the second support panel form a V shaped center support member when the first top panel and the second top panel substantially form a plane.

11. A step stool, comprising:

a first top panel rotatably connected to a second top panel, the first top panel and second top panel defining a planar surface in an unfolded configuration, the first top panel comprising a handle that defines a first through-hole and a second through-hole, the first through-hole extends from a top surface of the first top panel to an inner surface of the first top panel to define a contiguous first through-hole perimeter and the second through-hole extends from the top surface of the first top panel to the inner surface of the first top panel to define a contiguous second through-hole perimeter, and wherein the first through-hole perimeter and the second through hole perimeter are separated by at least a portion of the handle;

a front panel rotatably connected to the first top panel;

a rear panel rotatably connected to the second top panel;

a first side panel rotatably connected to the front panel;

a second side panel rotatably connected to the first side panel and rotatably connected to the rear panel;

a third side panel rotatably connected to the front panel;

a fourth side panel rotatably connected to the third side panel and rotatably connected to the rear panel;

a center support member having a first support panel and a second support panel that form a V shaped center support member when the first top panel and the second top panel substantially form a plane, the first support panel rotatably connected to an underside of the first top panel in a first hinged joint, the second support panel rotatably connected to an underside of the second top panel in a second hinged joint and rotatably connected to the first support panel;

a first foot defined by a second portion of the front panel and a portion of the first side panel;

a second foot defined by a portion of the front panel and a portion of the third side panel, a third foot defined by a portion of the rear panel and a portion of the second side panel;

a fourth foot defined by a second portion of the rear panel and a portion of the fourth side panel; and a fifth foot defined by a portion of the first support panel and a portion of the second support panel.

* * * * *